United States Patent
Le Costaouec

(10) Patent No.: US 10,160,170 B2
(45) Date of Patent: Dec. 25, 2018

(54) METHODS TO FABRICATE NEEDLED PREFORMS WITH RANDOMLY ORIENTED SHORT LENGTH CARBON FIBERS

(71) Applicant: GOODRICH CORPORATION, Charlotte, NC (US)

(72) Inventor: Jean-Francois Le Costaouec, Pueblo West, CO (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 15/843,701

(22) Filed: Dec. 15, 2017

(65) Prior Publication Data

US 2018/0099463 A1 Apr. 12, 2018

Related U.S. Application Data

(62) Division of application No. 14/230,246, filed on Mar. 31, 2014, now Pat. No. 9,873,231.

(51) Int. Cl.

| | |
|---|---|
| *B29C 70/50* | (2006.01) |
| *B29C 43/52* | (2006.01) |
| *F16D 69/02* | (2006.01) |
| *B29C 43/28* | (2006.01) |
| *D04H 1/488* | (2012.01) |
| *B29C 70/12* | (2006.01) |
| *B29C 43/34* | (2006.01) |
| *C04B 35/52* | (2006.01) |
| *C04B 35/71* | (2006.01) |
| *D04H 1/4242* | (2012.01) |

(Continued)

(52) U.S. Cl.

CPC ............ *B29C 70/502* (2013.01); *B29C 43/28* (2013.01); *B29C 43/34* (2013.01); *B29C 43/52* (2013.01); *B29C 70/12* (2013.01); *C04B 35/52* (2013.01); *C04B 35/71* (2013.01); *D04H 1/4242* (2013.01); *D04H 1/485* (2013.01); *D04H 1/488* (2013.01); *D04H 1/72* (2013.01); *F16D 69/026* (2013.01); *B29K 2101/12* (2013.01); *B29K 2105/128* (2013.01); *B29K 2307/04* (2013.01); *B29L 2031/16* (2013.01); *C04B 2235/526* (2013.01)

(58) Field of Classification Search

CPC ......... B29C 43/34; B29C 43/28; B29C 70/12; F16D 69/026; D04H 1/4242; D04H 1/485; C04B 35/52; C04B 35/71; C04B 2235/526; B29K 2307/04; B29K 2101/12

See application file for complete search history.

(56) References Cited

U.S. PATENT DOCUMENTS 5,609,707 A 3/1997 Bazshushtari

FOREIGN PATENT DOCUMENTS

| JP | 2000189731 | 7/2000 |
|---|---|---|
| WO | 0050676 | 8/2000 |
| WO | 0061518 | 10/2000 |

OTHER PUBLICATIONS

Extended Search Report dated Jul. 1, 2015 in European Application No. 15158566.8.

(Continued)

*Primary Examiner* — Robert J Grun
(74) *Attorney, Agent, or Firm* — Snell & Wilmer L.L.P.

(57) ABSTRACT

A method and apparatus for fabricating a short length carbon fiber preform with a through thickness reinforcement is disclosed herein. The starting media for fabricating a net shape (e.g., annular disc) may meet specific requirements including a sufficient fiber volume and a binding mechanism compatible with the needle-punching process.

7 Claims, 6 Drawing Sheets

(51) Int. Cl.
*D04H 1/485* (2012.01)
*D04H 1/72* (2012.01)
*B29K 101/12* (2006.01)
*B29K 105/12* (2006.01)
*B29K 307/04* (2006.01)
*B29L 31/16* (2006.01)

(56) References Cited

OTHER PUBLICATIONS

USPTO; Restriction Requirement Office Action dated Jul. 21, 2016 in U.S. Appl. No. 14/230,246.
USPTO; Non-Final Office Action dated Nov. 4, 2016 in U.S. Appl. No. 14/230,246.
USPTO; Final Office Action dated Jun. 2, 2017 in U.S. Appl. No. 14/230,246.
USPTO; Advisory Action dated Aug. 16, 2017 in U.S. Appl. No. 14/230,246.
USPTO; Notice of Allowance dated Oct. 11, 2017 in U.S. Appl. No. 14/230,246.

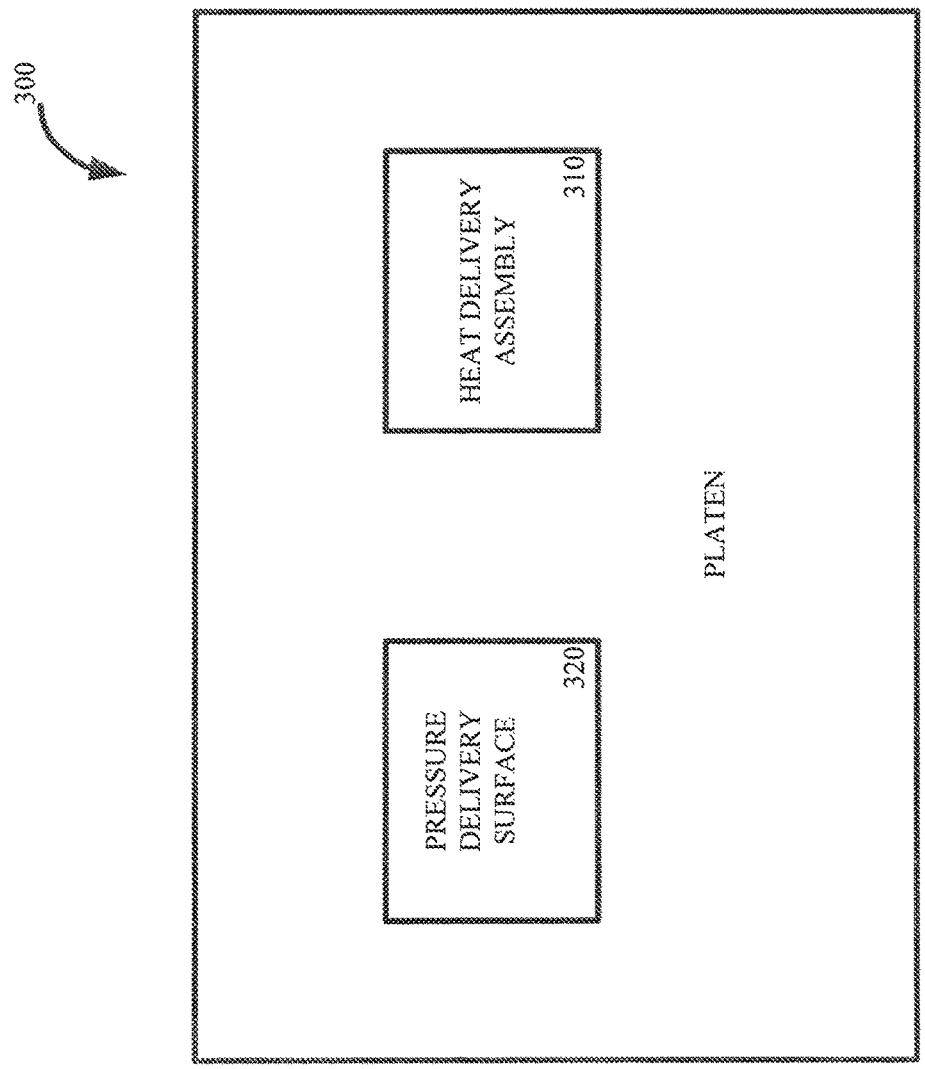

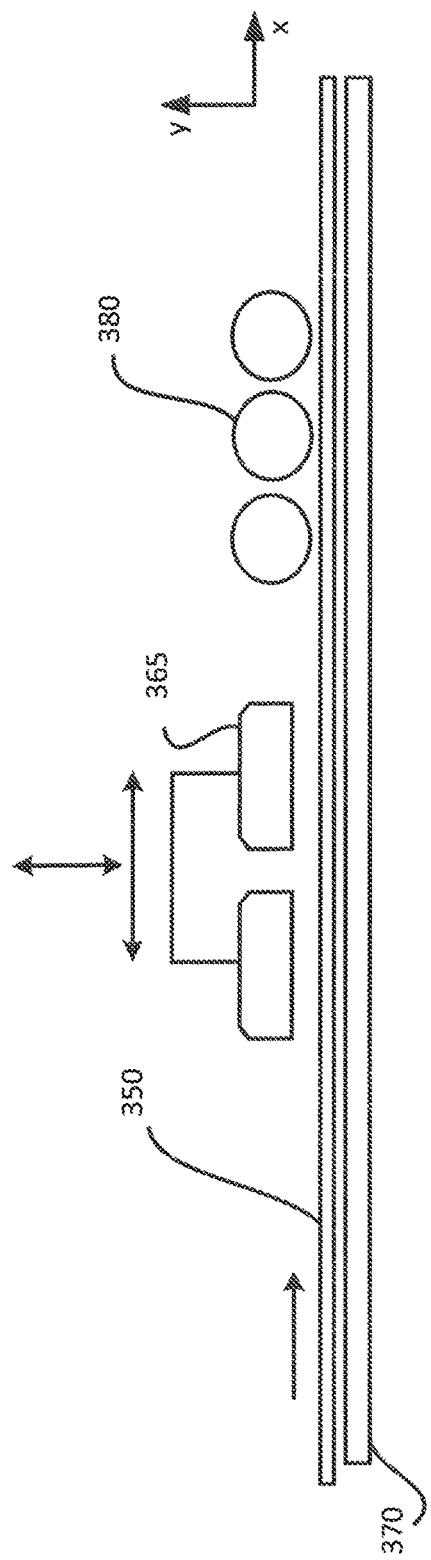

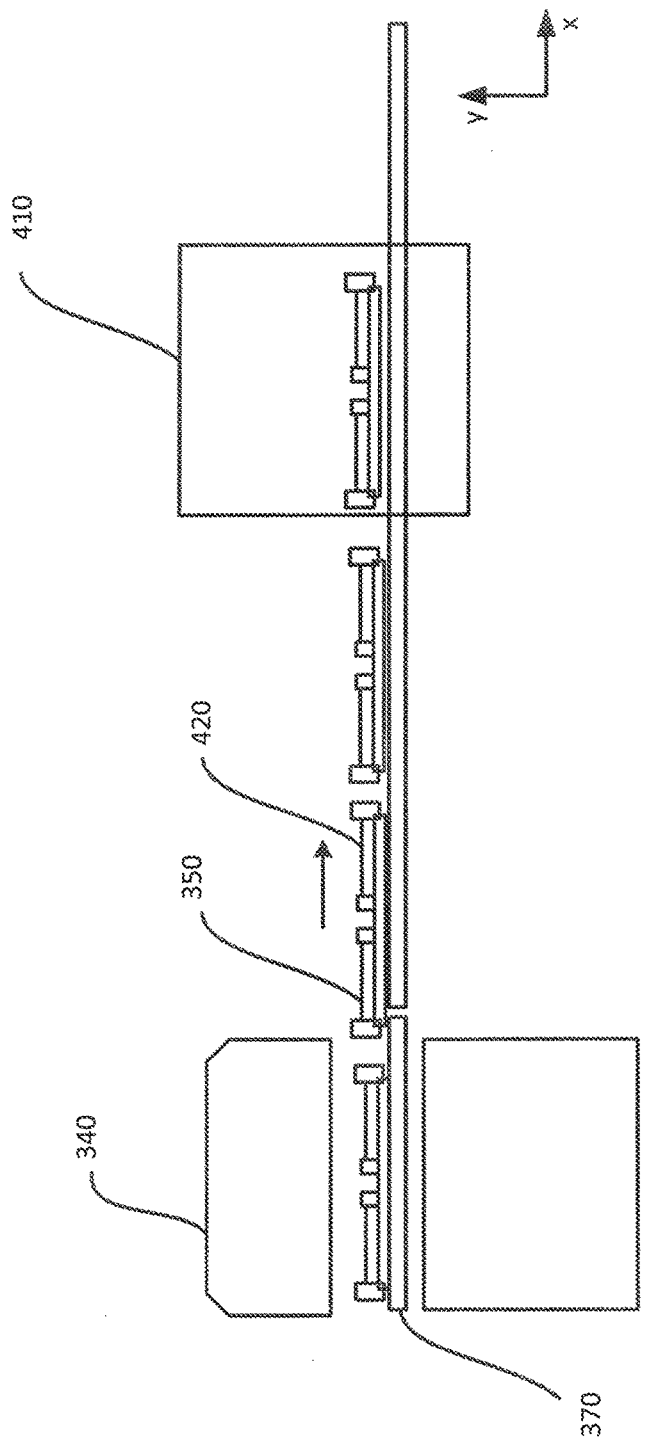

METHODS TO FABRICATE NEEDLED PREFORMS WITH RANDOMLY ORIENTED SHORT LENGTH CARBON FIBERS

CROSS-REFERENCE TO RELATED APPLICATION

This application is a divisional of U.S. Ser. No. 14/230,246, filed Mar. 31, 2014, entitled "METHODS TO FABRICATE NEEDLED PREFORMS WITH RANDOMLY ORIENTED SHORT LENGTH CARBON FIBERS," which is hereby incorporated by reference in its entirety.

FIELD

This disclosure generally relates to textile preparation, and more particularly, to systems and methods associated with short carbon fibers preforming.

BACKGROUND

Carbon/carbon ("C/C") parts are employed in various industries. An exemplary use for C/C parts includes using the parts as friction disks such as aircraft brake disks, race car brake disks, clutch disks, and the like. C/C brake disks are especially useful in such applications because of the superior high temperature characteristics of C/C material. In particular, the C/C material used in C/C parts is a good conductor of heat, and thus, is able to dissipate heat away from the braking surfaces that is generated in response to braking. C/C material is also highly resistant to heat damage, and is capable of sustaining friction between brake surfaces during severe braking, without a significant reduction in the friction coefficient or mechanical failure. The fabrication of C/C parts involves attention to detail at each step of the process.

SUMMARY

A technique for fabricating a short length carbon fiber preform with through thickness reinforcement is disclosed herein. The starting media for fabricating a net shape (e.g., annular disc) may meet specific requirements including a sufficient fiber volume and a binding mechanism compatible with the needle-punching process.

According to various embodiments, the technique may comprise opening up and blending a plurality of short length carbon fiber bundles and a fibrous binder material and depositing the fiber blend onto a porous surface. Heat may be locally applied to the blend of the plurality of short length carbon fiber bundles and the binder material to partially melt the binder material and form a preform section and form a self-standing preform section upon cooling. Pressure may be applied to the preform section to control preform section fiber volume. The heat and pressure may be delivered using a specially designed platen. The preform section and/or a portion of the preform section may be needled, such as on a circular needling loom to create a preform with z fibers. According to various embodiments, a net shaped preform may be created as heat is applied and with cooling under pressure.

BRIEF DESCRIPTION OF THE DRAWINGS

The present disclosure may be better understood with reference to the following drawing figures and description. Non-limiting and non-exhaustive descriptions are described with reference to the following drawing figures. The components in the figures are not necessarily to scale, emphasis instead being placed upon illustrating principles. In the figures, like referenced numerals may refer to like parts throughout the different figures unless otherwise specified.

Further, because the disclosed fibers, tows and yarns (and their orientations) in practice are very small and closely packed, the figures herein may show exaggerated and/or idealized fiber width and spacing in order to more clearly illustrate the fiber orientations and shape of the bundles.

FIGS. 3A, 3B and 3C illustrate preform assemblies in accordance with various embodiments; and FIG. 4 illustrates an air-laid forming apparatus in accordance with various embodiments.

DETAILED DESCRIPTION

Figure 1:
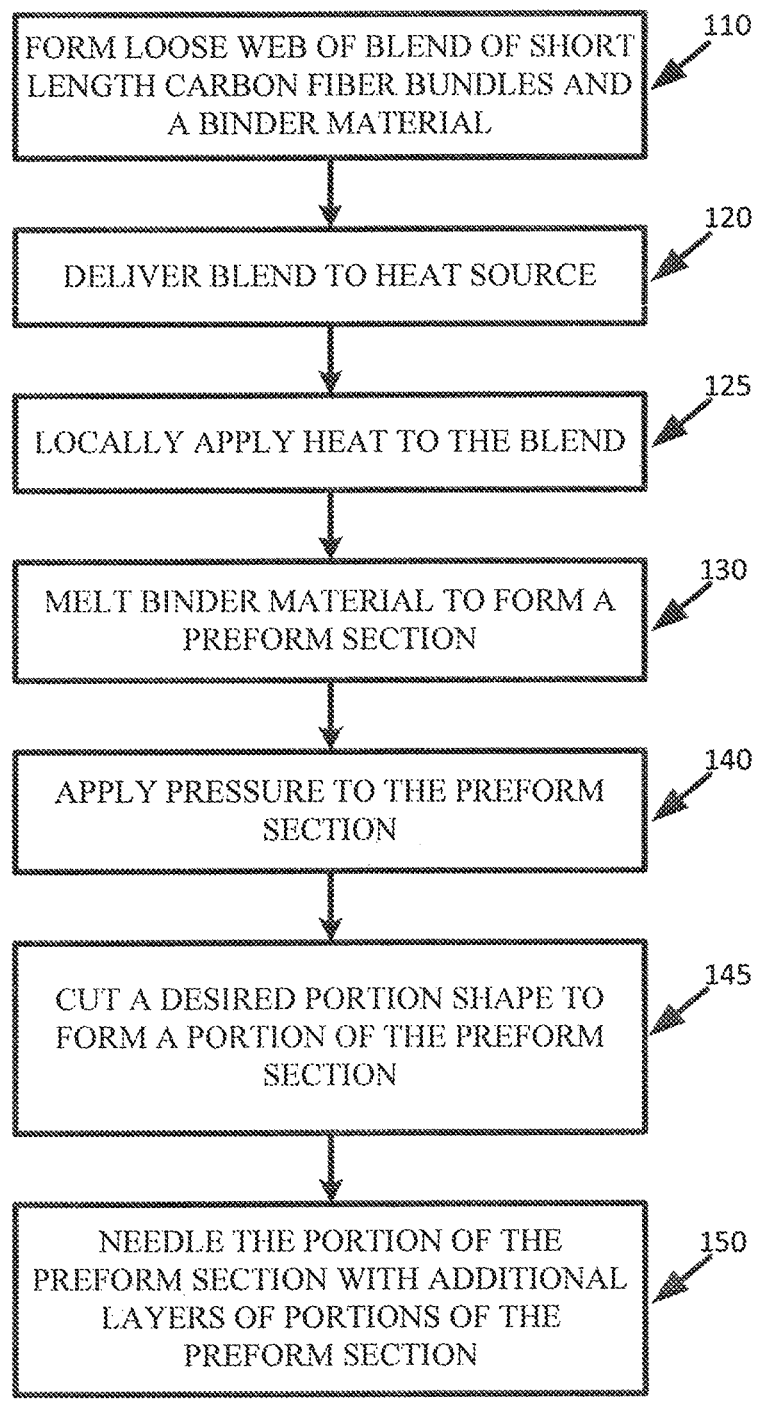
FIG. 1 illustrates a process flow chart of achieving a substantially continuous sheet of material in accordance with various embodiments.
Figure 2:
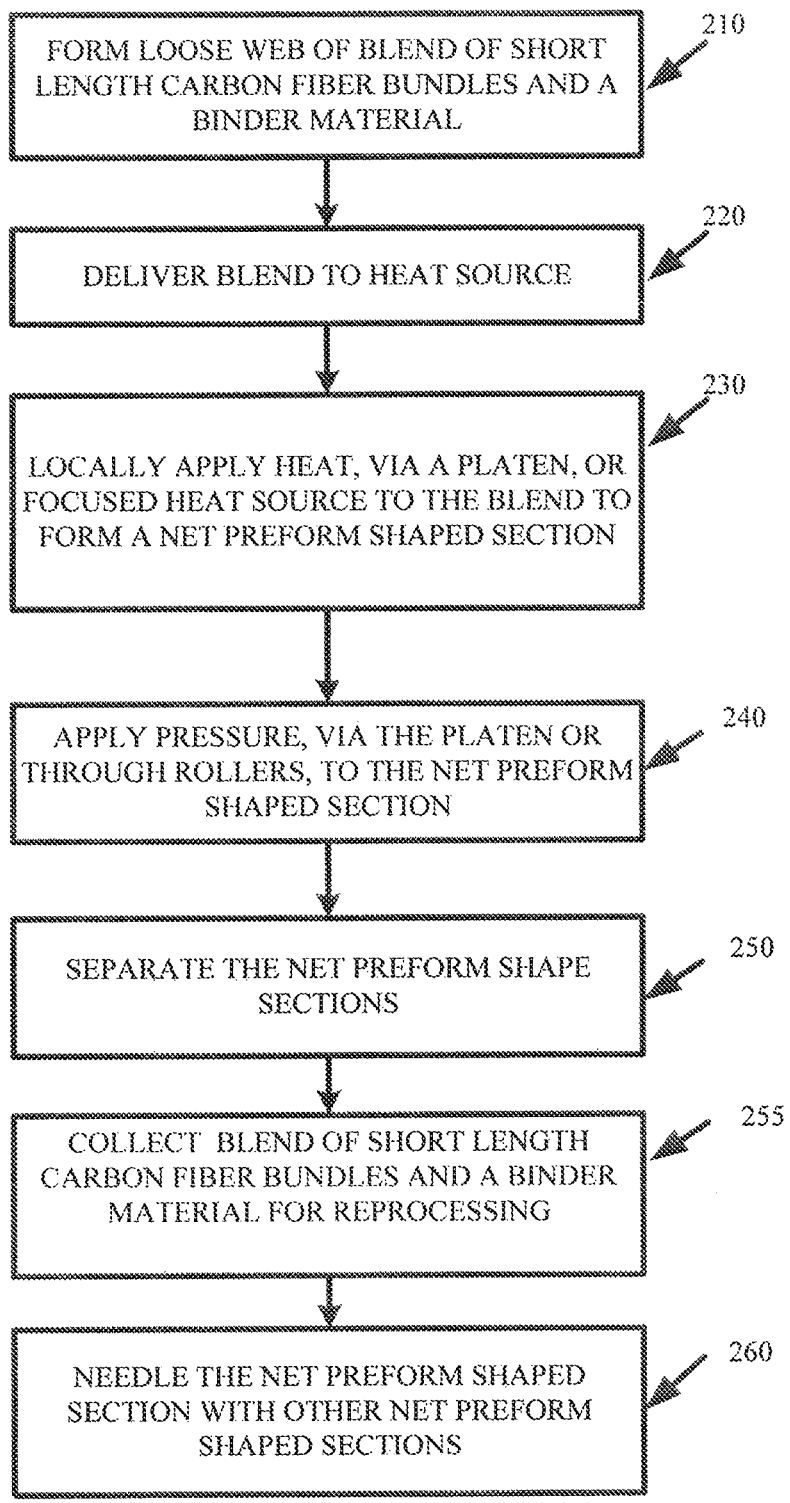
FIG. 2 illustrates a process flow chart of achieving net shape preform accordance with various embodiments.

The detailed description of various embodiments herein makes reference to the accompanying drawing figures, which show various embodiments and implementations thereof by way of illustration and its best mode, and not of limitation. While these embodiments are described in sufficient detail to enable those skilled in the art to practice the embodiments, it should be understood that other embodiments may be realized and that logical and mechanical changes may be made without departing from the spirit and scope of the disclosure. Furthermore, any reference to singular includes plural embodiments, and any reference to more than one component or step may include a singular embodiment or step.

Also, any reference to attached, fixed, connected or the like may include permanent, removable, temporary, partial, full and/or any other possible attachment option. Additionally, any reference to without contact (or similar phrases) may also include reduced contact or minimal contact. Finally, though the various embodiments discussed herein may be carried out in the context of an aircraft, it should be understood that systems and methods disclosed herein may be incorporated into anything needing a brake or having a wheel, or into any vehicle such as, for example, an aircraft, a train, a bus, an automobile and the like.

C/C material is generally formed by utilizing either continuous oxidized polyacrylonitrile (PAN) fibers, referred to as "OPF" fibers or carbonized carbon fibers, referred to herein as carbon fibers. Such fibers used to fabricate a preform shape using a needle punching process. OPF fibers or carbon fibers are layered in a selected orientation into a preform of a selected geometry. Typically, two or more layers of fibers are layered onto a support and are then needled together simultaneously or in a series of needling steps. This process interconnects the horizontal fibers with a third direction (also called the z-direction). The fibers extending into the third direction are also called z-fibers. This needling process may involve driving a multitude of barbed needles into the fibrous layers to displace a portion of the horizontal fibers into the z-direction.

As used herein, the terms "tow" and "cable" are used to refer to one or more strands of substantially continuous filaments. Thus, a "tow" or "cable" may refer to a plurality of strands of substantially continuous filaments or a single strand of substantially continuous filament.

As used herein, the unit "K" represents "thousand." Thus, a 1K tow means a tow comprising about 1,000 strands of substantially continuous filaments. For example, a "heavy tow" may comprise about 48,000 (48K) textile fibers in a single tow, whereas a "medium tow" may comprise about 24,000 (24K) textile fibers within a single tow whereas a "lighter tow" may comprise about 6,000 (6K) textile fibers within a single tow. Fewer or greater amounts of textile fibers may be used per cable in various embodiments. In various embodiments disclosed herein, starting carbon fiber tows in accordance with various embodiments may comprise tows of from about 0.1K to about 100K, and, in various embodiments, heavier tows.

Some fabric suppliers to the composite industry deliver tows pre-impregnated with a stiff resin or binder. These pre-impregnated tows are not an option when the fabric is subsequently transformed using a needle punching process. For instance, prior technologies have used a resin prepreg step to set the width of the tow, thus fixing the tow geometry during weaving. This approach, where the fibers are fully encapsulated with a resin, is however not compatible with a post operation, such as needle punching. The barbed needles have difficulty manipulating the tow in the Z direction once the tow is hardened via the resin.

Efforts to fabricate two dimensional carbon fiber preforms with random fiber orientations for brake applications have been pursued where the short carbon fibers are first dispersed in a slurry with an organic binder or a resin, vacuumed formed in a mold and pressed to reach a specific fiber volume. This type of material following further densification has poor inter-laminar shear strength.

According to various embodiments, a method for fabricating a short length carbon fiber preform with a through thickness reinforcement configured to enhance shear strength is disclosed herein. The starting media for fabricating a net shape (e.g., annular disc) needled preform with short fiber carbon fibers may meet specific requirements including a sufficient fiber volume, such as for through thickness reinforcement and a binding mechanism compatible with the needle-punching process.

An intermediate web and/or matt layer may be formed from a mixture of short length carbon fibers and a small amount of fusible fibers, such as pre-impregnated fibers or thermoplastic binding fibers and/or fibers of binder, configured to act as a binding mechanism emphasizing a minimum interference on the needle-punching process. The web may be formed using air-laid and/or wet laid (e.g., using a slurry) technologies. Following forming of the fibrous web, temperature and pressure may be used to set the integrity of the web at a selected fiber volume. It may be desirable to fabricate a heavy fibrous layer, such as a 400 g/m² (11.79 ounce/yrd²) to 1200 g/m² (35.39 ounce/yrd²) to minimize the amount of needling time. It may be desirable to use a carbon fiber length of about 1.5 inches (about 3.81 centimeters) to provide suitable mechanical strength. For instance, the short length carbon fiber lengths (e.g., carbon fiber precursor fibers) may be between the bounds of about 1 inch (about 2.54 centimeters) and about 2 inches (about 5.08 centimeters) and/or between about 0.5 and about 3 inches (about 1.27 and about 7.62 centimeters) where the term "about" in this context only means +/−0.25 inches (0.635 centimeter). The short length carbon fibers may be cut to size prior to blending with the fusible fibers.

It may also be preferable to control the degree of opening of part of the carbon fiber bundles so as to achieve a sufficient fiber volume within the web layer. Stated another way, according to various embodiments, less than fully opened carbon fiber bundles may be practiced in combination with fully opened carbon fiber bundles. Fully opened carbon fiber bundles result in a very low fiber volume web which would not lead to a needled preform of at least 21% fiber volume, which is desirable. Larger carbon fiber bundle filament count may be advantageously used to minimize raw material cost. For instance, a higher filament carbon fiber bundle, such as between about 12K-50K, may be used with acceptable results. In general, the higher the filament count of the fiber bundle allows for the lower the cost from a fiber bundle supplier. According to various embodiments, a filament count of the short length carbon fiber bundles may be between about 6K to about 100K. The fusible fibers may be selected such that the polymers disappear completely during the carbonization step following preform fabrication.

Monocomponent thermoplastic fibers, such as polypropylene, polyethylene, and/or polyester, could be used for this application; however, bi-component fibers with a higher temperature core and lower melting temperature sheath are more effective at creating local bonds with neighboring fibers with lesser quantities of binding fibers. Bi-components fibers, such as polypropylene/polyethylene, polyester/polyethylene, co-polyester and/or polyester, are candidate fibers for the present application. Such fibers are available in range from 1 to 20 dtex. Low denier bi-component fibers between 1 and 5 dtex may effectively be used in this application. Low denier bi-component fibers such as polypropylene core and polyethylene sheath fibers may be desirable fusible fibers as the shape of the polypropylene is maintained and only the polyethylene content is used as the binder. Stated another way, the low denier bi-component fibers may comprise polypropylene core, a polyethylene sheath fiber, and a polyester core with at least one of either polyester and polypropylene sheath fiber. This allows for an acceptable distribution of the binder in small amounts without negatively affecting the transfer of carbon fiber during the needle-punching step. The fusible fiber length may be several millimeters. For instance, though they may be any acceptable length, the fusible fiber lengths may be between the bounds of about 3 and about 12 millimeters (about 0.1181 and about 0.4724 inch) and/or between about 2 millimeters (about 0.07874 inch) and about 15 millimeters (about 0.5906 inch) where the term "about" in this context only means +/−0.5 millimeters (0.01969 inch). It is preferable using a low fiber decitex. According to various embodiments, the blend of short length carbon fibers and fusible fibers may be formed into an annular shaped mold.

According to various embodiments and with reference to FIG. 1, using air-laid forming equipment including feeding, opening/blending, and/or webbing zones, a loose web may be first formed on a porous conveying surface in the form of a wide band (step 110). The loose web may be delivered to a heat source via the porous conveying surface (step 120). Heated pressing platens may be used to heat set fibrous pieces within the web (step 125). According to various embodiments, the platen assembly may comprise a heat delivery assembly configured to deliver a shaped heat pattern. The shaped heat pattern may heat the blend of the plurality of short length carbon fiber bundles and a binder material to partially melt the binder material and form a preform section (step 130). The preform section may be any desired shape. The preform section, in the form of a continuous roll of web, may have sufficient aggregate stiffness to be cut into a form, be handled and retain its shape. The preform section may be needled by a needling process. The platen assembly may comprise a heated tunnel and pressing device to apply heat and pressure to the preform section and/or the blend of short length carbon fiber bundles and a binder material (step 140). The heat delivery assembly and the pressure delivery surface may be the same surface and/or integral surfaces. According to various embodiments, preform sections may be punched and/or cut from larger formed sheets (step 145). The web layers, in the form of sectors or annular portions are assembled on a circular needle machine to form annular shaped needled preforms (step 150). The method described herein enables fabrication of randomly oriented short fiber length preforms with through thickness fiber reinforcement. Carbon fiber preforms may subsequently be densified using chemical vapor infiltration, resin or pitch infiltration of an hybrid densification. Continuous carbon fibers, e.g., those longer than the preform shape width, (e.g., about 5 inches (about 12.7 centimeters)) may not be utilized in the method described herein. The method described herein may be used to fabricate various resin matrix composites with two dimensional or three dimensional reinforcement.

Figure 3B:
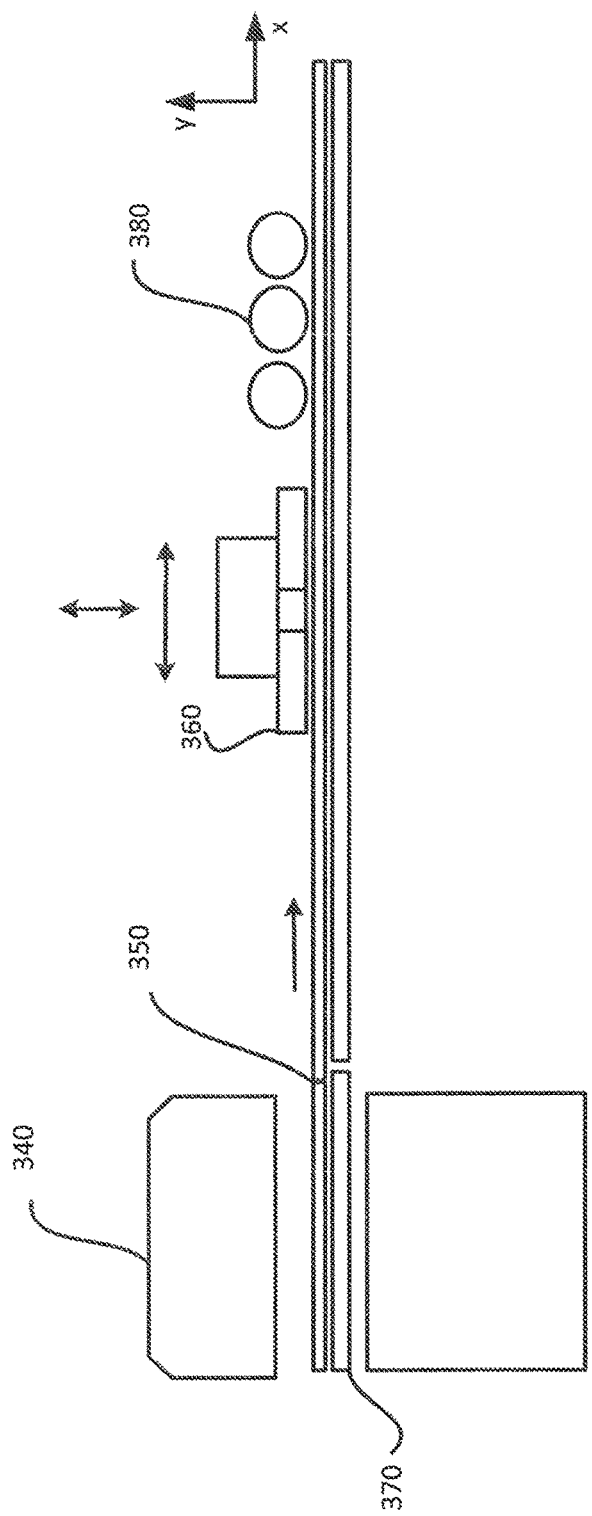

According to various embodiments and with reference to FIGS. 2, 3A, 3B and 3C, using air-laid forming 340 a loose web 350 may be first formed on a surface such as a porous conveying surface 370, in the form of a wide band (step 210). A second conveying surface transports the loose web towards heating section (step 220). A moveable heated platen assembly 300, may be used to heat set annular fibrous pieces within the web. According to various embodiments, the platen assembly 300 may comprise a heat delivery assembly 310 configured to deliver a shaped heat pattern. The heat delivery assembly 310 may be a contact heat delivery assembly 360 in FIG. 3B and/or a non-contact heat delivery assembly 365 in FIG. 3C. The shaped heat pattern may mirror the shape of a pressure delivery surface 320. The platen may comprise an annular shaped surface. The platen assembly 300 may comprise a heat delivery assembly configured to deliver an annular shaped heat delivery. The shaped heat pattern may heat the blend of the plurality of short length carbon fiber bundles and a binder material to partially melt the binder material and form a partially melted net shape preform (step 230). The platen assembly 300 may comprise a pressure delivery surface configured to apply pressure to the net shape preform and/or to the blend of short length carbon fiber bundles and a binder material (step 240). Net preform shaped sections may be separated from the non-heated and/or pressure treated blend of short length carbon fiber bundles and a binder material (step 250). The heated platen may be followed by a succession of fixed cold pressing rollers 380. Alternatively, the moveable pressing platen assembly may be equipped to sequentially provide heat and cold temperature under pressure. As shown in FIG. 3C, heat may be locally provided by a moveable focused heating source, such as non-contact heat source 365. The net shape preforms may be collected and assembled on a circular needle machine to form annular shaped needled preforms (step 260). The annular preform layer may be introduced as is or presented as a 360 degree sector following one cut along radial direction.

The pressure delivery surface 320 and/or heat providing apparatus (e.g., heat delivery assembly 310) may mirror the net shape preform. For instance, the pressure delivery surface 320 and/or the shape of the heat delivery assembly 310 may be an annular shaped disc. The unused blend of short length carbon fiber bundles and a binder material not contacted/heated by the heat delivery assembly 310 (e.g., those outside the OD or interior to the ID, not having received heat) may be recycled and fed to the air-laid machine feeding system for reprocessing (step 255).

According to various embodiments, the fiber blend may be introduced in a formed porous annular cavity 420. Stated another way, the techniques described herein are applicable to an air-laid forming in shaped porous mold cavities 420. For example, the formed porous cavities 400 may be fed under an air-laid forming section 340 as shown in FIG. 4. Heat and/or pressure would be applied on line or in separate off-line equipment 410.

According to various embodiments, a slurry process may be used where the carbon fibers and bi-component fibers are opened and blended in aqueous suspension. Fibers suspension may be injected under pressure into a porous shaped annular cavity or alternatively vacuum formed on a screen forming part of an open annular cavity. Following extraction of water, fiber preforms may be heated to partially melt fusible bi-component fiber. This operation may be performed with added pressure to control fiber volume.

According to various embodiments, a blend of short length carbon fibers, such as about 1.5 inch (about 3.81 centimeters) long, with some amount of the binder, such as the thermoplastic fibers of a generally smaller respective length is generated. Though any ratio may be practiced, in general, about 3% fusible fibers to 97% short length carbon fibers is preferred. A ratio in the range of about 0.5% to about 10% fusible fibers to short length carbon fibers is preferred in the blend of short length carbon fibers and fusible fibers.

According to various embodiments, the blend of short length carbon fibers and fusible fibers formed with air flow or air and vacuum may be delivered, such as on a conveyor belt, to a heat source. The heat source may partially melt the binder, such as the binder/fusible fibers. Pressure may be applied via heavy rollers to the partially melted fiber blend. A substantially continuous sheet of material may be formed. From the continuous sheet of material desired shapes of preform and/or preform sections may be punched and/or cut.

According to various embodiments, as the blend of short fibers of carbon fiber and thermoplastic binder fibers is transported, after forming with air-laid equipment, a net perform shape such as an annular shape and/or a desired sector of an annular shape, may be formed. For instance, heaters may locally apply heat to partially melt desired binder fibers to achieve a desired resultant shape. The heater may be shaped such that the desired resultant shape is achieved and/or the delivery of the heat may be controlled such that the desired resultant shape is achieved. In this way, waste product is reduced. The excess blend of short fibers of carbon fiber and thermoplastic binder fibers may be captured for reprocessing.

According to various embodiments, the blend of short fibers of carbon fiber and thermoplastic binder fibers may be delivered to a mold in the form of a slurry or with an air-laid feeding and forming system. Following water extraction, this mold may be heated to form a resultant desired shape. Pressure may be used to control the preform fiber volume. In this way, waste material is minimized as compared to a process where desired shapes are cut and/or punched from a sheet of material.

In this way, a preform, of at least 21% fiber volume, may be created that may be layered for needling without adverse consequences during the needling stage. The needling may improve the internal inertia properties of the resultant composite form. The 21% fiber volume may be achieved via at least one of a tow opening and a level of pressure applied on the partially melted mix during a cooling stage.

Additionally, benefits, other advantages, and solutions to problems have been described herein with regard to various embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, and C" or "at least one of A, B, or C" is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the singular forms "a," "an," and "the" include plural referents unless the context clearly dictates otherwise. As used herein, the terms "for example," "for instance," "such as," or "including" are meant to introduce examples that further clarify more general subject matter. Unless otherwise specified, these examples are embodiments of the present disclosure, and are not meant to be limiting in any fashion.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for forming an annular preform section, comprising:

a blender configured to open, blend and web in random fiber orientation a plurality of short length carbon fiber bundles and a thermoplastic binder material to form a blend;

a first annular shaped disc configured to be heated and to locally apply heat to an annular portion of the blend to form a partially melted annular shaped preform;

a second annular shaped disc configured to locally apply pressure to the partially melted annular shaped preform;

a needler configured to needle the partially melted annular shaped preform to form the annular preform section; and a collector configured to remove from the blend an excess portion not partially melted following local application of heat and pressure and to return the excess portion to the blender for reprocessing.

2. The system of claim 1, wherein a length of the plurality of short length carbon fiber bundles is between about one inch and about two inches.

3. The system of claim 1, wherein a length of the plurality of short length carbon fiber bundles is between about one-half inches and about three inches.

4. The system of claim 1, wherein the thermoplastic binder material comprises low denier bi-component fibers.

5. The system of claim 1, wherein the thermoplastic binder material comprises at least one of a polypropylene core, a polyethylene sheath fiber and a polyester core with at least one of either polyester and polypropylene sheath fiber.

6. The system of claim 1, wherein a ratio of the thermoplastic binder material to the plurality of short length carbon fiber bundles in the blend is between about .5% to about 10% by volume.

7. The system of claim 1, wherein the thermoplastic binder material comprises fusible fibers, wherein a length of the fusible fibers range in length from about 2 mm to about 15 mm.

* * * * *